(12) United States Patent
Koyama et al.

(10) Patent No.: US 8,543,845 B2
(45) Date of Patent: Sep. 24, 2013

(54) METHOD FOR SUPPRESSING A VOLTAGE FLUCTUATION APPLYING TO A LOAD BY A SECOND POWER SECTION WITH THE SAME OR OPPOSITE VOLTAGE POLARITY

(75) Inventors: Yoshito Koyama, Kawasaki (JP); Minoru Hirahara, Kawasaki (JP); Seiji Miyoshi, Kawasaki (JP); Eiji Miyachika, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 666 days.

(21) Appl. No.: 12/659,729

(22) Filed: Mar. 18, 2010

(65) Prior Publication Data
US 2010/0176781 A1    Jul. 15, 2010

Related U.S. Application Data

(63) Continuation of application No. PCT/JP2007/068196, filed on Sep. 19, 2007.

(51) Int. Cl.
*G06F 1/00* (2006.01)
*G05F 1/00* (2006.01)

(52) U.S. Cl.
USPC ......................................... 713/300; 323/282

(58) Field of Classification Search
USPC ......................................... 713/320, 324, 340
See application file for complete search history.

(56) References Cited

U.S. PATENT DOCUMENTS

| | | | |
|---|---|---|---|
| 6,646,425 B2 | 11/2003 | Miftakhutdinov | |
| 6,703,814 B2 | 3/2004 | Pohlman et al. | |
| 7,170,273 B2 | 1/2007 | Sase et al. | |
| 7,492,136 B2 | 2/2009 | Schuellein | |
| 2004/0061380 A1* | 4/2004 | Hann et al. | 307/43 |
| 2004/0227497 A1* | 11/2004 | Asanuma et al. | 323/283 |
| 2006/0061216 A1* | 3/2006 | Chou et al. | 307/30 |

FOREIGN PATENT DOCUMENTS

| | | |
|---|---|---|
| JP | 63-100991 | 6/1988 |
| JP | 11-122814 | 4/1999 |
| JP | 2001-224176 | 8/2001 |
| JP | 2003-316482 | 11/2003 |
| JP | 2004-23990 | 1/2004 |
| JP | 2004-96816 | 3/2004 |
| JP | 2004-112896 | 4/2004 |
| JP | 2004-350471 | 12/2004 |
| JP | 2006-34025 | 2/2006 |
| JP | 2006-262549 | 9/2006 |

OTHER PUBLICATIONS

Japanese Office Action mailed Apr. 10, 2012 issued in corresponding Japanese Patent Application No. 2009-532991.

(Continued)

*Primary Examiner* — Thomas Lee
*Assistant Examiner* — Phil Nguyen
(74) *Attorney, Agent, or Firm* — Staas & Halsey LLP

(57) ABSTRACT

A power supply device includes: a first supply section that supplies power in accordance with an extent of a load in processing in a processing device by applying a voltage to the processing device which processes data; and a second supply section that supplies, to the processing device, power smaller than the supplying power by the first supply section, in accordance with an extent of a load in processing in the processing device to increase and decrease a voltage with respect to the application voltage by the first supply section.

6 Claims, 9 Drawing Sheets

(56) References Cited

OTHER PUBLICATIONS

English Translation of the International Preliminary Report on Patentability mailed Apr. 15, 2010 and issued in corresponding International Patent Application PCT/JP2007/068196.

International Search Report for PCT/JP2007/068196, mailed on Dec. 18, 2007.

U.S. Office Action for related U.S. Appl. No. 12/659,727, mailed on Oct. 28, 2010.

* cited by examiner

METHOD FOR SUPPRESSING A VOLTAGE FLUCTUATION APPLYING TO A LOAD BY A SECOND POWER SECTION WITH THE SAME OR OPPOSITE VOLTAGE POLARITY

CROSS-REFERENCE TO RELATED APPLICATION

This is a continuation application of PCT/JP2007/068196, filed on Sep. 19, 2007.

FIELD

The embodiment discussed herein is related to a power supply device that supplies power to a processing device and an electronic apparatus mounted with the power supply device.

BACKGROUND

Conventionally, in an electronic apparatus such as a communication device and a server device, there is provided a power supply device that supplies power to an IC or the like that executes various kinds of processing. Such power supply device is required of supplying stable power consistently, and in particular, required of adjusting an output voltage that is outputted to an IC or the like to be constant.

FIG. 1 schematically illustrates a structure of a power supply device that supplies power to an electronic apparatus.

A power supply device 10 illustrated in FIG. 1 is a power supply device employing an analog control method in which an output voltage to an IC or the like is controlled with the use of an analog component such as an amplifier and a comparator.

The power supply device 10 includes a voltage detection circuit 11, an error amplifier 12, a compensation circuit 13, a reference oscillator 14, a comparator 15, a switch element 16, a smoothing filter 17 and so on.

Firstly, in the voltage detection circuit 11, a power output voltage Vout that is currently outputted from the power supply device 10 to an IC or the like is detected, and the detected output voltage Vout is transmitted to the error amplifier 12. In the error amplifier 12, a difference between the output voltage Vout and a reference voltage V0 is amplified and outputted. In the compensation circuit 13, an amplified voltage Vg that is outputted from the error amplifier 12 is adjusted to a value appropriate to the sensitivity of the comparator 15.

In the reference oscillator 14, a voltage signal Vp of sawtooth waveform is outputted at a given frequency. In the comparator 15, the voltage signal Vp of sawtooth waveform outputted from the reference oscillator 14 is compared with the amplified voltage Vg that has been adjusted in the compensation circuit 13, and a control signal that becomes "ON" while the voltage signal Vp of sawtooth waveform is smaller than the amplified voltage Vg, and becomes "OFF" at all other times is transmitted to the switch element 16.

In the switch element 16, since "ON-OFF" is thus controlled by the control signal transmitted from the comparator 15, a pulse width of the input voltage Vin that has been inputted to the power supply device 10 is adjusted, and a smoothing operation is executed in the smoothing filter 17. As a consequence, the output voltage Vout of which voltage value has been adjusted is outputted from the power supply device 10 to an electronic apparatus. For example, if the output voltage Vout detected in the voltage detection circuit 11 drops, an error between the output voltage Vout and the reference voltage V0 which is calculated in the error amplifier 12 becomes large. As a consequence, the voltage signal Vp of sawtooth waveform becomes smaller than the amplified voltage Vg, causing "ON" duration of the control signal outputted from the comparator 15 longer, so that the pulse width of the input voltage Vin is adjusted to be longer and the output voltage Vout is raised.

In the power supply device 10, the output voltage that is outputted to a processing section is controlled to be constant as described above.

Here, in an electronic apparatus, various kinds of components, an IC and the like which are included in the electronic apparatus is supplied with power to operate. In these components, the IC and the like, a power consumption changes in accordance with an amount of load in processing shared by each of the components, the IC and the like. If such individual fluctuation of load is moderate, it is possible to supply required power consistently by absorbing the fluctuation of load in each component and thus maintaining a voltage to be applied to the components and the IC or the like to be constant. However, in a communication device or a server device among the electronic apparatuses, there is a case in which a load in the IC or the like that executes communication processing abruptly fluctuates in synchronization with a state of communications traffic, which makes it difficult to absorb abrupt fluctuations of load in such a local place under an overall control by a single power supply device.

For this reason, there is proposed a technique that absorbs local fluctuations of load individually and maintains necessary power supply independently by providing plural power supply devices in such a manner that at least one power supply device is disposed near the various kinds of components, the IC and the like included in the electronic apparatus, and by individually controlling a voltage to be applied to the various kinds of components, the IC and the like (see U.S. Pat. No. 6,646,425, for example).

However, even if the voltage to be applied to the various kinds of components and the IC or the like is controlled individually by the technique disclosed in the U.S. Pat. No. 6,646,425, in a case where fluctuations of load in a component that adjoins a component targeted for controlling by a power supply device are too large, there often occurs a problem that the power supply device may not be able to maintain proper power supply to the control target, by being affected by the fluctuations of load in other component that is not targeted for controlling.

SUMMARY

According to an aspect of the invention, a power supply device includes:

a first supply section that supplies power in accordance with an extent of a load in processing in a processing device by applying a voltage to the processing device which processes data; and a second supply section that supplies, to the processing device, power smaller than the supplying power by the first supply section, in accordance with an extent of a load in processing in the processing device to increase and decrease a voltage with respect to the application voltage by the first supply section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described with reference to the drawings.

Figure 1:
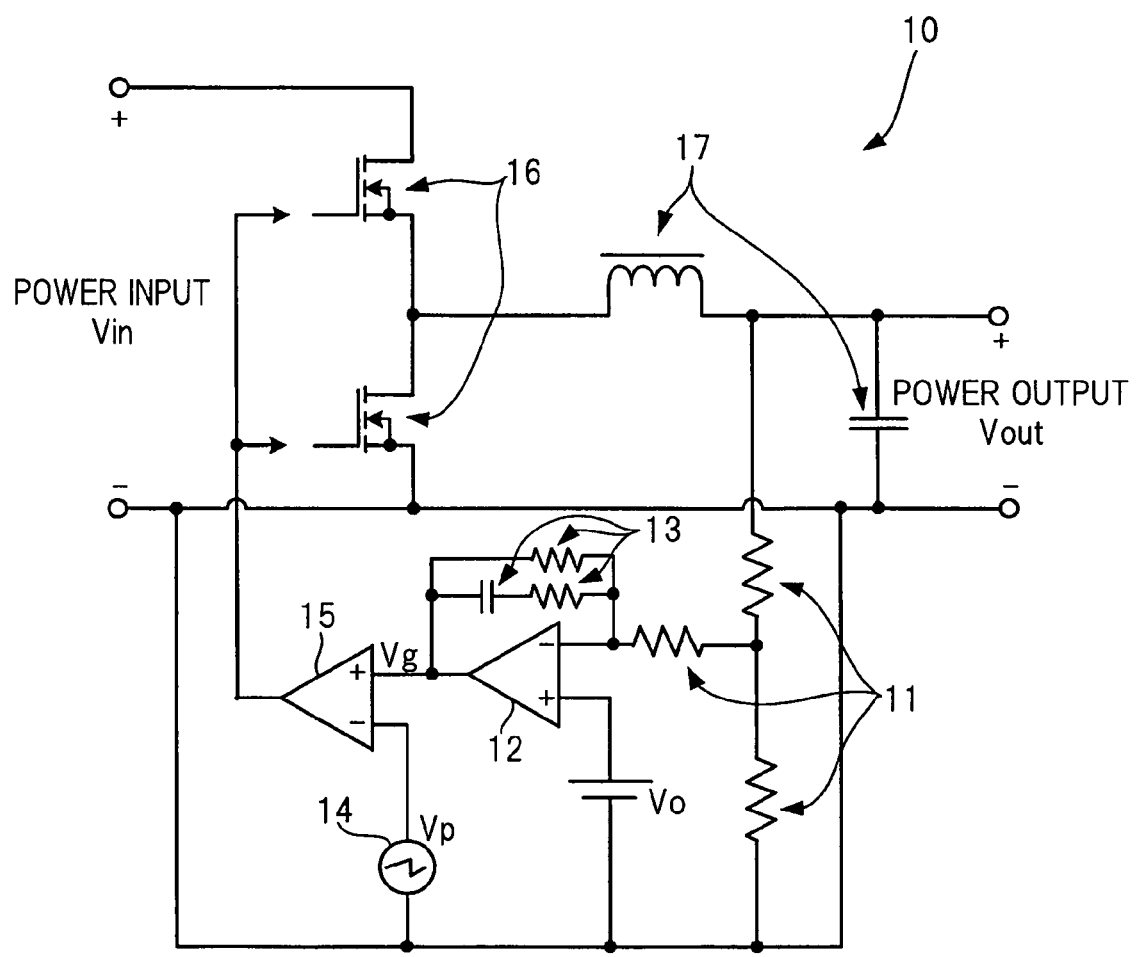
FIG. 1 is a schematic diagram of a power supply device that supplies power to an electronic apparatus.
Figure 2:
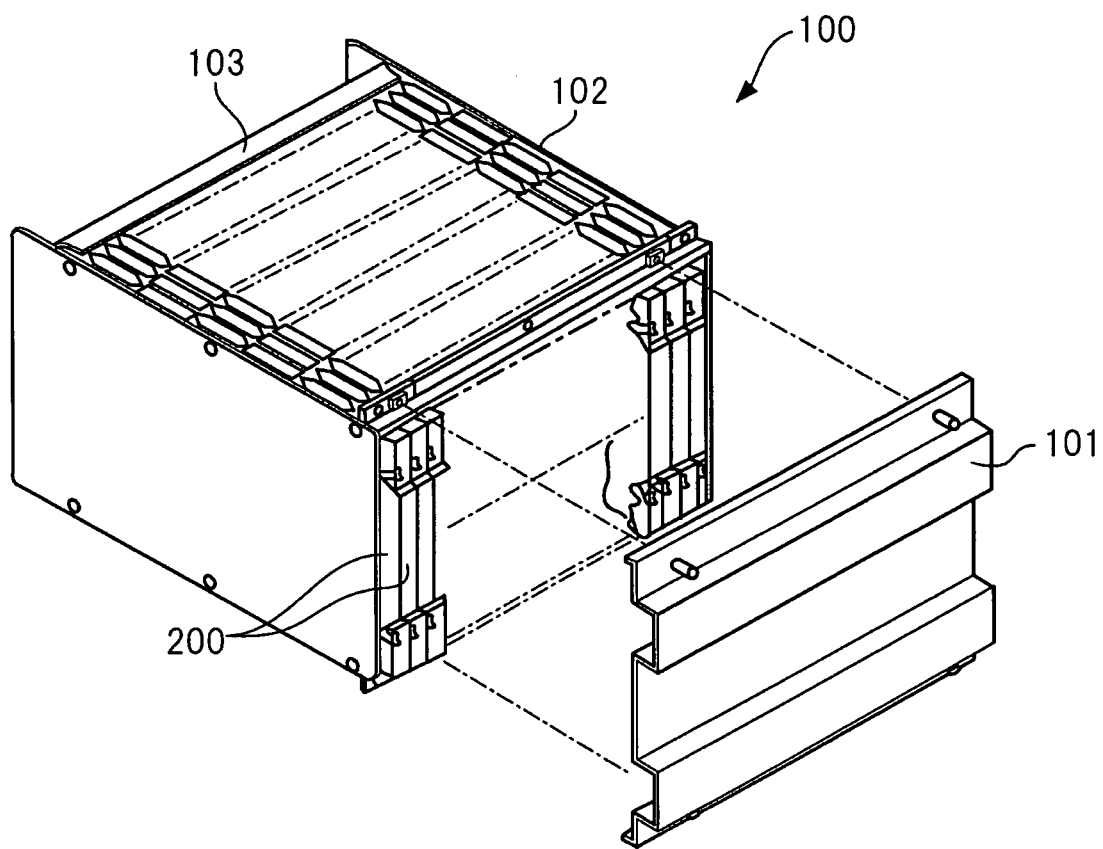
FIG. 2 is an external perspective view of a communication unit according to one embodiment of the present invention.

FIG. 2 is an external perspective view of a communication unit according to one embodiment of the present invention.

A communication unit 100 is one example of the electronic apparatus according to the present invention, which transmits and receives data via a network. The communication unit 100 includes a unit cover 101, a unit frame 102, a back panel 103, and plural electronic circuit packages 200 which execute processing, housed in a space enclosed with these cover, frame and back panel.

On an inside of the back panel 103, various kinds of connectors (not illustrated) to transmit data and power are provided. These connectors are engaged with connectors arranged in the plural electronic circuit packages 200, respectively, so that the plural electronic circuit packages 200 are connected to each other.

The plural electronic circuit packages 200 sequentially execute processing for communication data transmitted via a network, and in response to processing executed in an upstream electronic circuit package 200, processing in a downstream electronic circuit package 200 is started. Additionally, each electronic circuit package 200 includes a board 220 (see FIG. 4) to which an IC or the like is mounted and a holding plate 210 (see FIG. 3) for holding the board 220.

Figure 3:
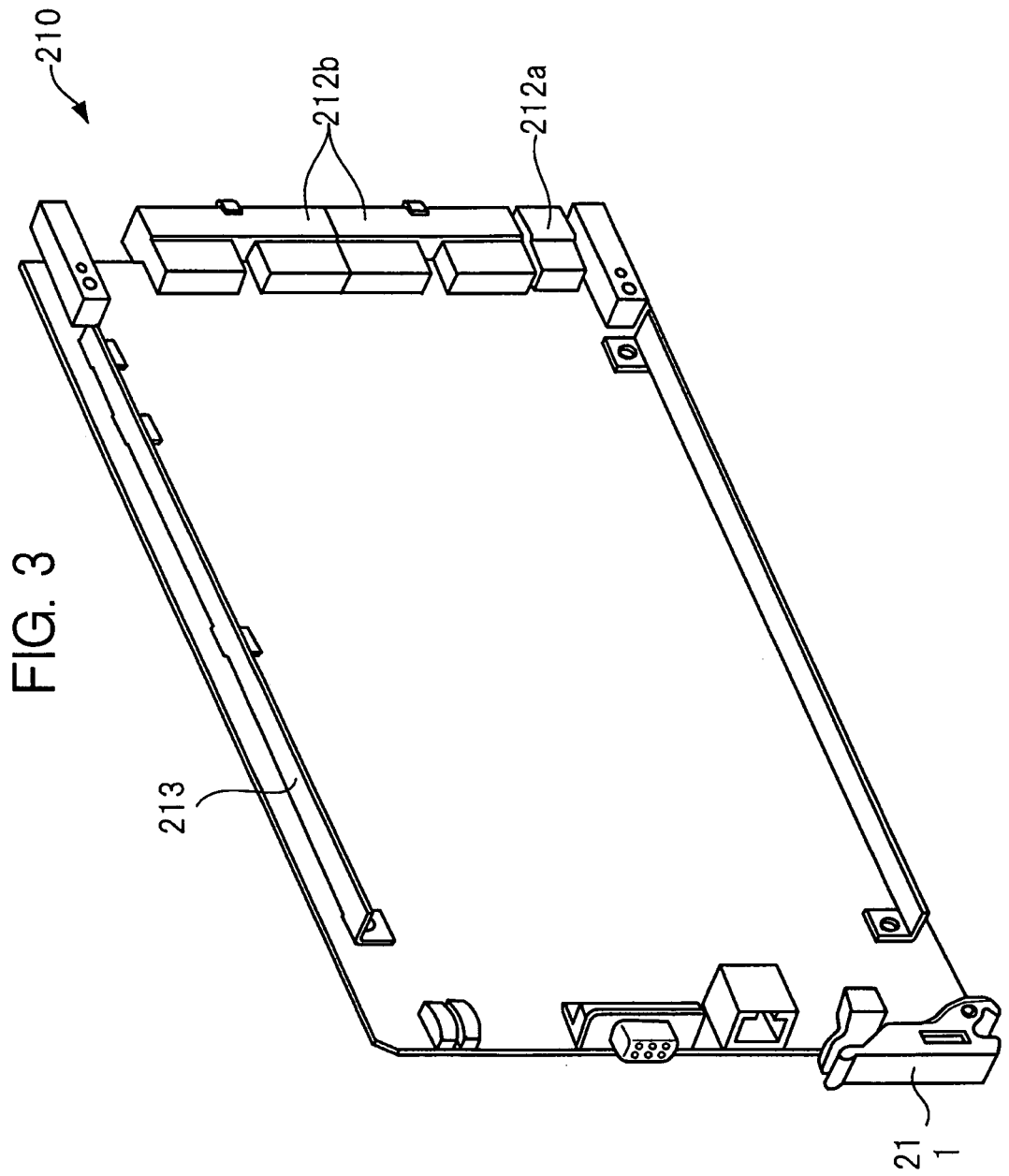
FIG. 3 is a perspective view of a holding plate 210 included in an electronic circuit package 200.
Figure 4:
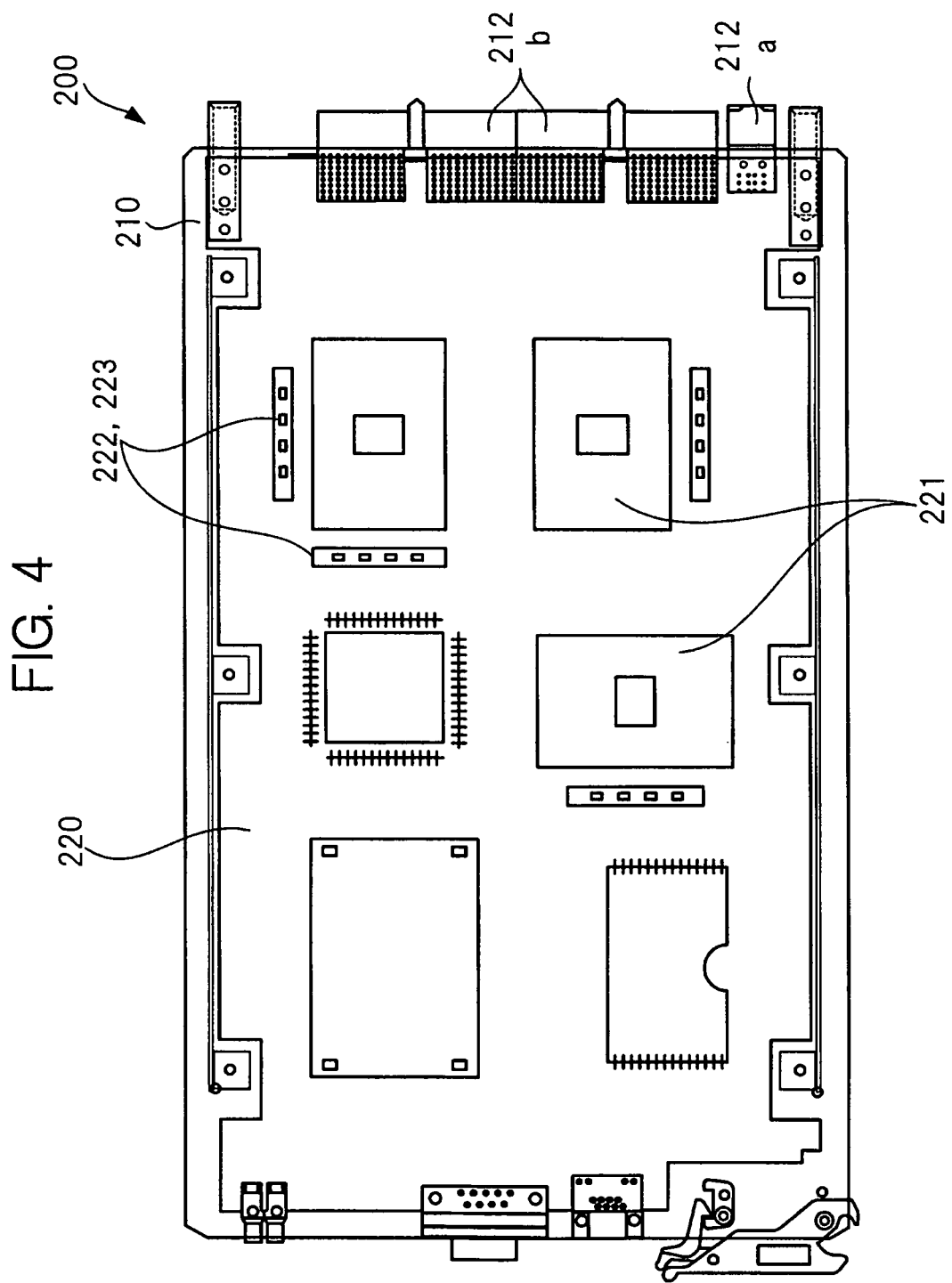
FIG. 4 is a schematic diagram of the electronic circuit package 200 in which a board 220 is attached to the holding plate 210.

FIG. 3 is a perspective view of the holding plate 210 included in the electronic circuit package 200, and FIG. 4 is a schematic diagram of the electronic circuit package 200 in which the board 220 is attached to the holding plate 210.

The holding plate 210 includes a grip section 211 to be gripped with a hand when inserting and extracting the holding plate 210 to and from the unit frame 102 in FIG. 2, a power connector 212a to input power to the electronic circuit package 200, a curve preventing metal member 213 to prevent curving of the board 220, and data connectors 212b to transmit and receive various kinds of data and the like.

FIG. 4 illustrates the electronic circuit package 200 in a state in which the board 220 is attached to the holding plate 210. The board 220 is equipped with plural processing circuits 221 such as an IC, and power supply sources to supply power to each of the plural processing circuits 221. Here in this embodiment, as the power supply sources, there are provided a power supply source (large OBP) 222 having a relatively large capacity, which supplies relatively large power to the entire plural processing circuits 221 by applying a voltage to the entire plural processing circuits 221, and a power supply source (small OBP) 223 having a relatively small capacity, which supplies relatively small power to each of the processing circuits 221 by applying a voltage to be reduced from the application voltage supplied by the large OBP 223. That is, the power to be supplied to each of the processing circuits 221 is one that is outputted jointly by the large OBP 222 and the small OBP 223. In this embodiment, as will be described later, on the board 220, one large OBP 222 is mounted and plural groups, each composed of three small OBP's 223 are mounted, one group for each processing circuit 221. Here, the large OBP 222 and the small OBP's 223 correspond to one example of the first supply section and the second supply section, respectively. Also, the processing circuit 221 is one example of the processing section according to the present invention, and the plural processing circuits 221 as a whole correspond to one example of the processing device according to the present invention.

The board 220 is fitted into the holding plate 210, the power connector 212a and the data connectors 212b in the holding plate 210 are inserted into the board 220, and thereby the board 220 is attached to the holding plate 210. Furthermore, the holding plate 210 is fitted into the unit frame 102 illustrated in FIG. 2 and connected to a connector in the back panel 103, and thus the plural electronic circuit packages 200 are connected to one another.

Figure 5:
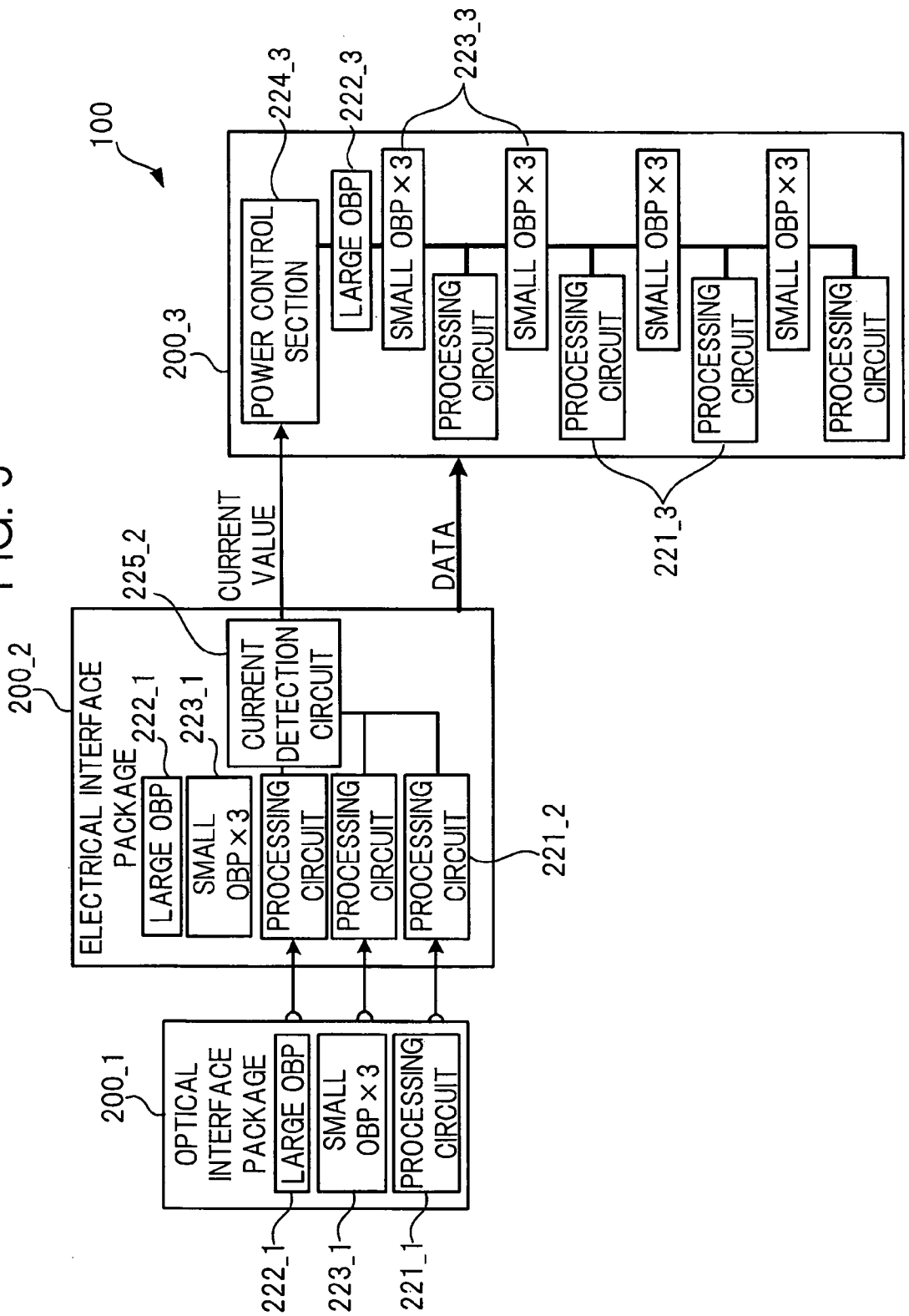
FIG. 5 is a schematic functional block diagram of three electronic circuit packages 200_1, 200_2, and 200_3 among the plural electronic circuit packages illustrated in FIG. 2.

FIG. 5 is a schematic functional block diagram of three electronic circuit packages 200_1, 200_2, and 200_3 among the plural electronic circuit packages 200 illustrated in FIG. 2.

Hereafter, explanation will be made about various components included in three electronic circuit packages 200_1, 200_2, and 200_3 by identifying each by its affixed last number.

FIG. 5 illustrates an optical interface package 200_1 that receives optical data transmitted via a network, an electrical interface package 200_2 that converts the optical data received in the optical interface package 200_1 into digital data, and a signal processing package 200_3 that subjects various kinds of signal processing to the digital data converted in the electrical interface package 200_2. In this embodiment, power is inputted to the entire communication unit 100 illustrated in FIG. 2, and the power is distributed to the large OBP 222 and the small OBP's 223 included in each electronic circuit package 200. Thereafter, in each electronic circuit package 200, the large OBP 222 applies a voltage to the plural processing circuits 221 as a whole, and further, each small OBP 223 applies a voltage to be reduced from the application voltage by the large OBP 222, to each processing circuit 221, and thus the power necessary for processing is supplied to each processing circuit 221.

The electrical interface package 200_2 includes a current detection circuit 225_2 that detects a value of a current flowing into a processing circuit 221_2 when the processing is executed. The signal processing package 200_3 includes a power control section 224_3 that obtains the value of the current detected by the current detection circuit 225_2 in the electrical interface package 2002 and controls power supply in the large OBP 222_3 and the small OBP 223_3 in accordance with the obtained current value.

Figure 6:
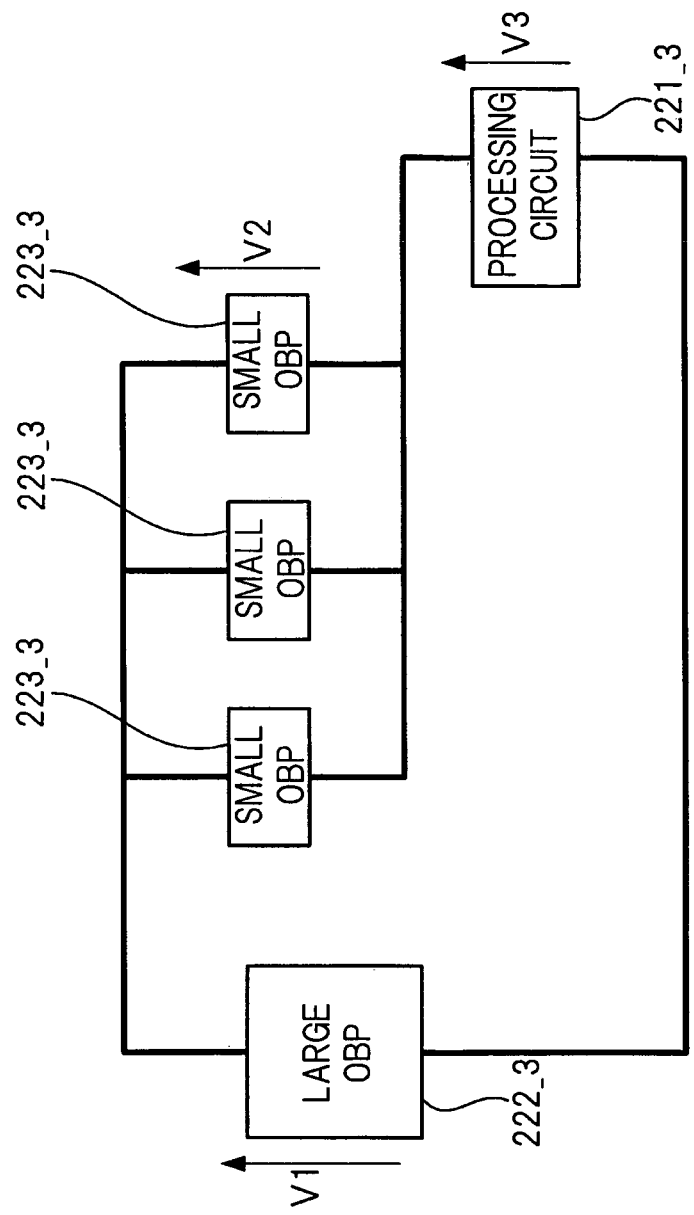
FIG. 6 is a diagram to explain a flow of power supply in a signal processing package 200_3.

FIG. 6 is a diagram to explain a flow of power supply in the signal processing package 200_3. Although plural processing circuits 221_3 are mounted in the signal processing package 200_3, in FIG. 6, only one processing circuit 221_3 is illustrated, typically, and further, one large OBP 222_3 that supplies power to the whole plural processing circuits 221_3 and three small OBP's 223_3 that supply power to one processing circuit 221_3 in FIG. 6 are illustrated. These three small OBP's 223_3 are connected in parallel.

As found from FIG. 6, a group composed of the three small OBP's 223_3 connected in parallel and the large OBP 222_3 are connected in series. Since an application voltage V1 by the large OBP 223_3 and an application voltage V2 by the small OBP's 222_3 are opposite to each other in polarity, an application voltage V3 to be applied to the processing circuit 221_3 is a voltage calculated by subtracting the application voltage V2 by the small OBP's 223_3 from the application voltage V1 by the large OBP 222_3.

Here, if a load changes in the processing circuit 221_3, a current flowing into the processing circuit 221_3 changes and as a consequence, the voltage V3 to be applied to the processing circuit 221_3 is going to change.

In this embodiment, under the control of the power control section 224_3 in FIG. 5, the large OBP 222_3 controls own application voltage V1 so as to suppress fluctuations of an average value among the plural processing circuits 2213. That is, the large OBP 222_3 supplies power in accordance with an extent of the overall load in executing processing in the signal processing package 200_3, by controlling the application voltage V1 in this manner. However, the control of the large OBP 222_3 is only performed averagedly, and a speed of the control is small because the large OBP 222_3 has a large capacity, and a fast voltage change according to a load change of each processing circuits 221_3 may not be suppressed.

Therefore, in order to suppress such rapid voltage fluctuation locally in each of the processing circuits 221_3 to supply necessary power for the respective processing circuits 221_3, the small OBP's 223_3 each having a relatively small capacity are provided near the respective processing circuits 221_3.

The small OBP 223_3 applies the application voltage V2 that is opposite in polarity to the application voltage V1 applied from the large OBP 222_3, in relatively small power to one processing circuit 221_3 as a target to be controlled by the small OBP 223_3. With this, from the application voltage V1 applied from the large OBP 222_3, the application voltage V2 applied from the small OBP 223_3 is subtracted, and thus the application voltage V3 of the processing circuit 221_3 is applied. The small OBP 223_3 controls in such a manner that a voltage fluctuation in the application voltage V3 of the processing circuit 221_3 is suppressed individually by the application voltage V2 for subtraction. Here, the control by the small OBP 223_3 is rapid since the control is executed for each processing circuit 2213 and the capacity is small. Therefore, it is possible to securely suppress a rapid voltage fluctuation in each processing circuit 221_3, which may not be suppressed by the large OBP 222_3, and maintain necessary power supply for each processing circuit 221_3. On the other hand, due to its small capacity, if any large fluctuation of load occurs in other processing circuit 221_3 different from the one processing circuit 221_3 as the power supply target and if it causes a large fluctuation of voltage in power, the small OBP 223_3 may not be able to control the application voltage V2 properly. However, the speed of such large fluctuation of voltage in power is small so that it is possible to significantly suppress the fluctuation by the control of the large OBP 222_3. In this way, in this embodiment, the control by the large OBP 222_3 and the control by the small OBP's 223_3 compensate each other to control the application voltage V3 in each processing circuit 221_3 to be constant, and thus adequate power supply to each processing circuit 221_3 is maintained.

In this embodiment, three small OBP's 222_3 are provided for one processing circuit 221_3. As such, subtraction for the application voltage from the large OBP 222_3 is executed by the joint control by the group composed of these three small OBP's 223_3, the precision of control is further improved.

Next, controls of application voltage in the large OBP 222_3 and the small OBP's 223_3 will be explained in detail. Incidentally, in the large OBP 222_3 and the small OBP's 223_3, control methods themselves are common so that in the following diagram, the explanation will be made by adding a reference numeral "227" to a simple OBP having no distinction of large or small. Also, in the following diagram, a reference numeral "228" is added to a processing circuit that receives power supply from this OBP 227.

Figure 7:
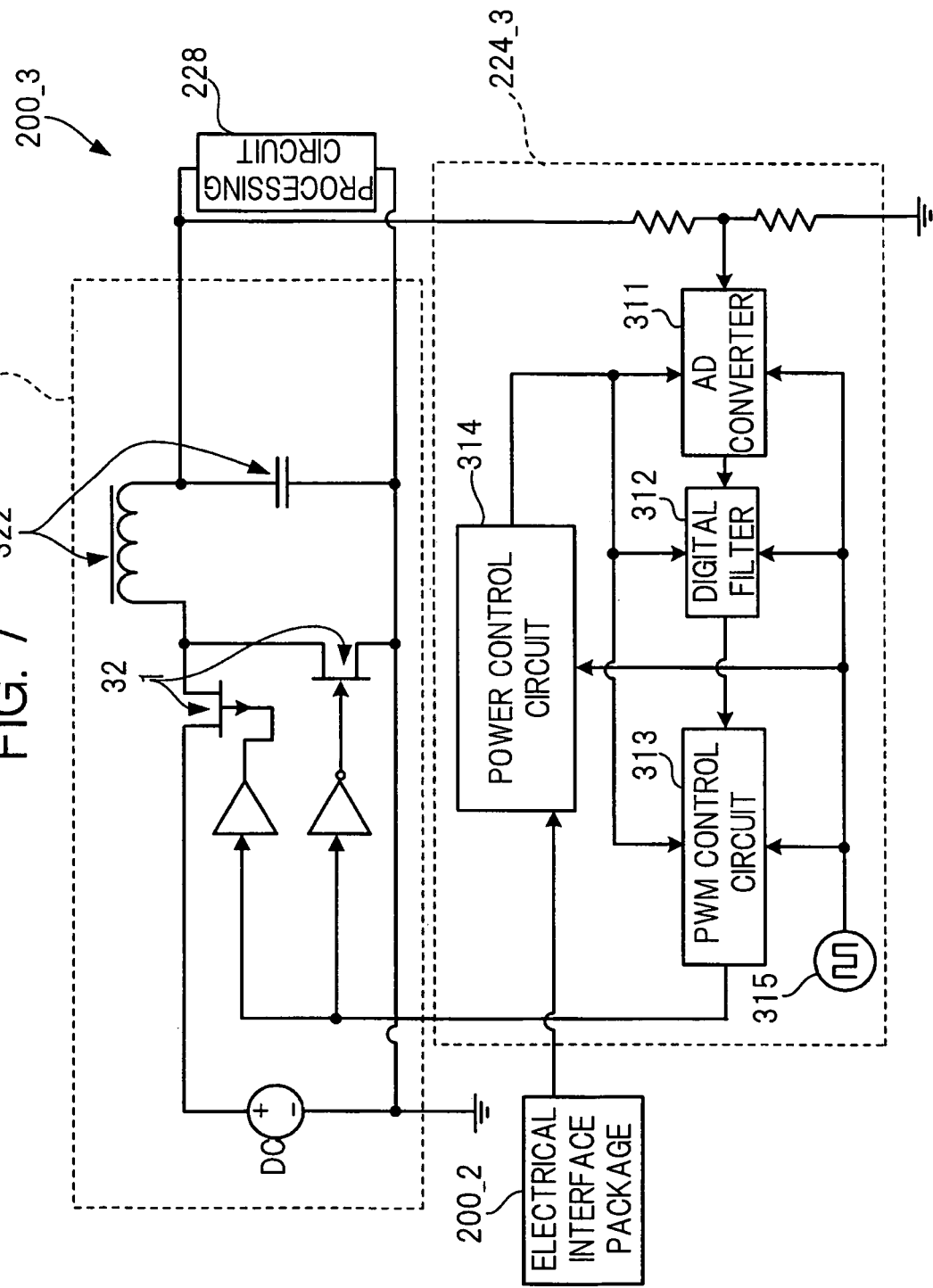
FIG. 7 is a schematic diagram of a processing circuit 228, an OBP 227, and a power control section 224_3 also illustrated in FIG. 5.

FIG. 7 is a schematic diagram of a processing circuit 228, the OBP 227, and the power control section 224_3 also illustrated in FIG. 5.

Incidentally, in FIG. 7, for the sake of explaining a control principal of application voltage, a simplified circuit is illustrated, in which power is supplied to one processing circuit 228 by one OBP 227.

As illustrated in FIG. 7, the power control section 224_3 includes an AD (Analog-Digital) converter 311, a digital filter 312, a PWM control circuit 313, a power control circuit 314, and a pulse generator 315. The OBP 227 includes a switch element 321, a smoothing filter 322 and the like.

When controlling power supply to the processing circuit 228, basically, in a similar manner as in a conventional analog power supply device, feedback processing is executed, in which power to be supplied later than the present time is controlled based on the power that has been supplied earlier than the present time.

Firstly, in the AD converter 311, a voltage that has been applied to the processing circuit 228 from the OBP 227 earlier than the present time is detected, and the detected voltage is converted into a digital signal and transmitted to the digital filter 312. The digital filter 312 calculates a difference between the detected voltage and the above-described reference voltage that has been previously set, averages the difference to generate an error signal. Here, in the digital filter 312, for the large OBP, an average value of the application voltages detected for the respective processing circuits is calculated and the error signal is generated by using the average value.

The error signal generated in the digital filter 312 is transmitted to the PWM control circuit 313.

The PWM control circuit 313 generates a control signal having a pulse width in accordance with a control value transmitted from the power control section 314, based on a pulse signal generated from the pulse generator 315 and the error signal transmitted from the digital filter 312, and the generated control signal is transmitted to the switch element 321.

The switch element 321 controls ON-OFF according to the control signal transmitted from the PWM control circuit 313, and as a result, the pulse width of the input voltage is adjusted. Furthermore, a voltage whose pulse width has been adjusted passes the smoothing filter 322, and thereby the application voltage is smoothed and power is supplied to the processing circuit 228.

For example, if the application voltage drops, the value of the error signal generated in the digital filter 312 becomes large and a control signal whose pulse width is longer is generated in the power control circuit 314. As a result, a "ON" duration of the switch element 321 becomes longer, and the application voltage increases. In this way, the power to be supplied to the processing circuit 228 is adjusted by the feedback processing.

Moreover, in this embodiment, to the power control circuit 314, the value of the current flowing into the processing circuit 2212 in the electrical interface package 200_2 from an upstream electrical interface package 200_2 is transmitted. In general, the more the amount of communication data to be processed increases, the more the load of processing increases, and usually a large current flows into the processing circuit. Since the value of the current flowing into the upstream electrical interface package 200_2 is transmitted, it is possible to predict a load to be processed from now on in the processing circuit 228.

The power control circuit 314 controls the AD converter 311 such that the larger the current value obtained from the electrical interface package 200_2 is, the more the detected voltage is reduced. It also controls the digital filter 312 so as to apply a smaller reference voltage for a larger current value that is obtained, and controls the PWM control circuit 313 so as to increase the pulse width of the control signal for a larger current value that is obtained. As a result, the application voltage by the OBP 227 rises.

In this way, according to this embodiment, based on power supplied before the present time, power to be supplied later than the present time is adjusted (feedback control) as well as power supply is adjusted according to a load in processing in the upstream electrical interface package 2002 (feedforward control). Therefore, it is possible to supply power stably to the processing circuits and reduce problems due to the increase of a load in processing. Also, as described above, in this embodiment, since the large OBP 221_3 of a relatively large capacity and the small OBP 222_3 of a relatively small capacity compensate each other, it is possible to supply power adequately to each processing circuit.

Incidentally, in the above description, the example is illustrated in which an application voltage from the small OBP is subtracted from an application voltage from the large OBP to generate an application voltage for a processing circuit. However, the present invention is not limited to this, and may generate an application voltage for a processing circuit by adding an application voltage from the small OBP to an application voltage from the large OBP.

Figure 8:
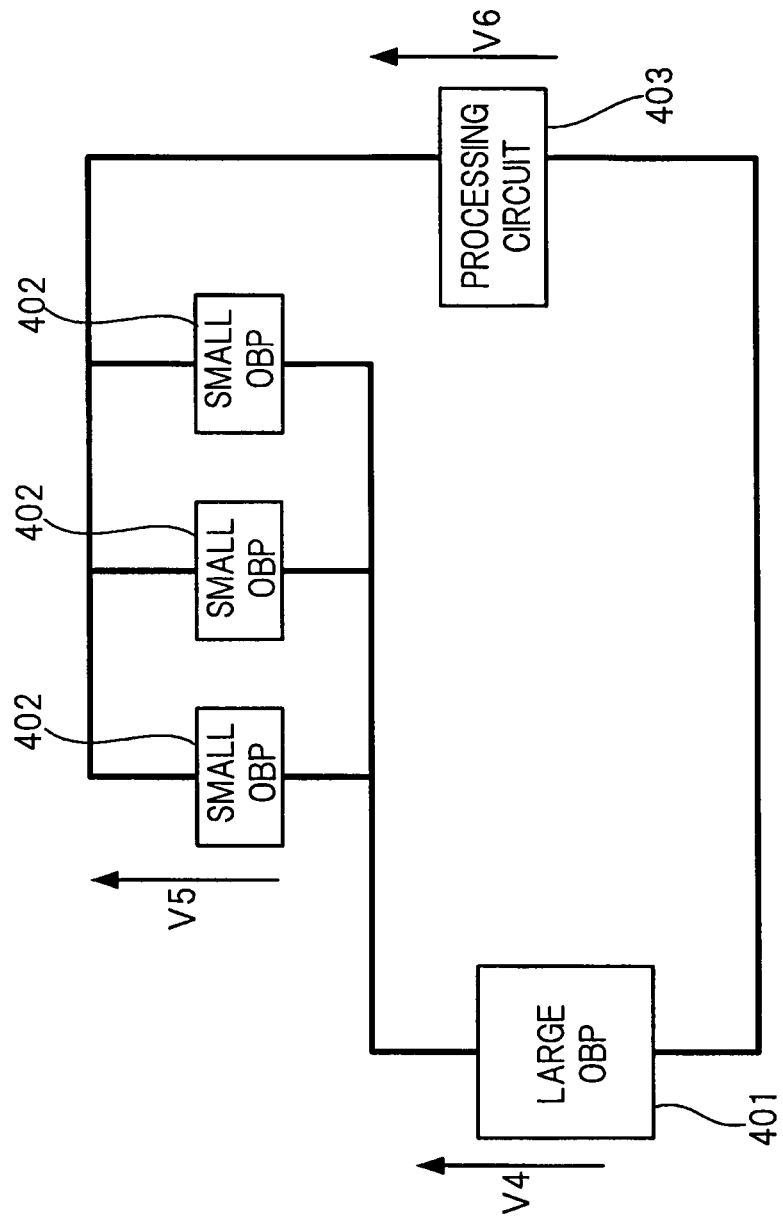
FIG. 8 illustrates one example of a circuit structure that generates an application voltage for a processing circuit by adding an application voltage from a small OBP to an application voltage from a large OBP.

FIG. 8 illustrates one example of a circuit structure that generates an application voltage for a processing circuit by adding an application voltage from a small OBP to an application voltage from a large OBP.

In the circuit structure of FIG. 8, a group composed of three small OBP's 402 connected in parallel and a large OBP 401 are connected in series. Since an application voltage V4 applied by the large OBP 401 and an application voltage V5 applied by the small OBP's 402 are same to each other in polarity, an application voltage V6 to be applied to a processing circuit 403 is a voltage calculated by adding the application voltage V5 by the small OBP's 402 to the application voltage V1 by the large OBP 401.

Incidentally, the method of increasing an application voltage from a large OBP by adding an application voltage from a small OBP as well as decreasing an application voltage from the large OBP by subtracting an application voltage from the small OBP is not limited to the use of only either one of the subtraction and addition, and as will be described later, it is possible to use both the addition and the subtraction in combination.

Figure 9:
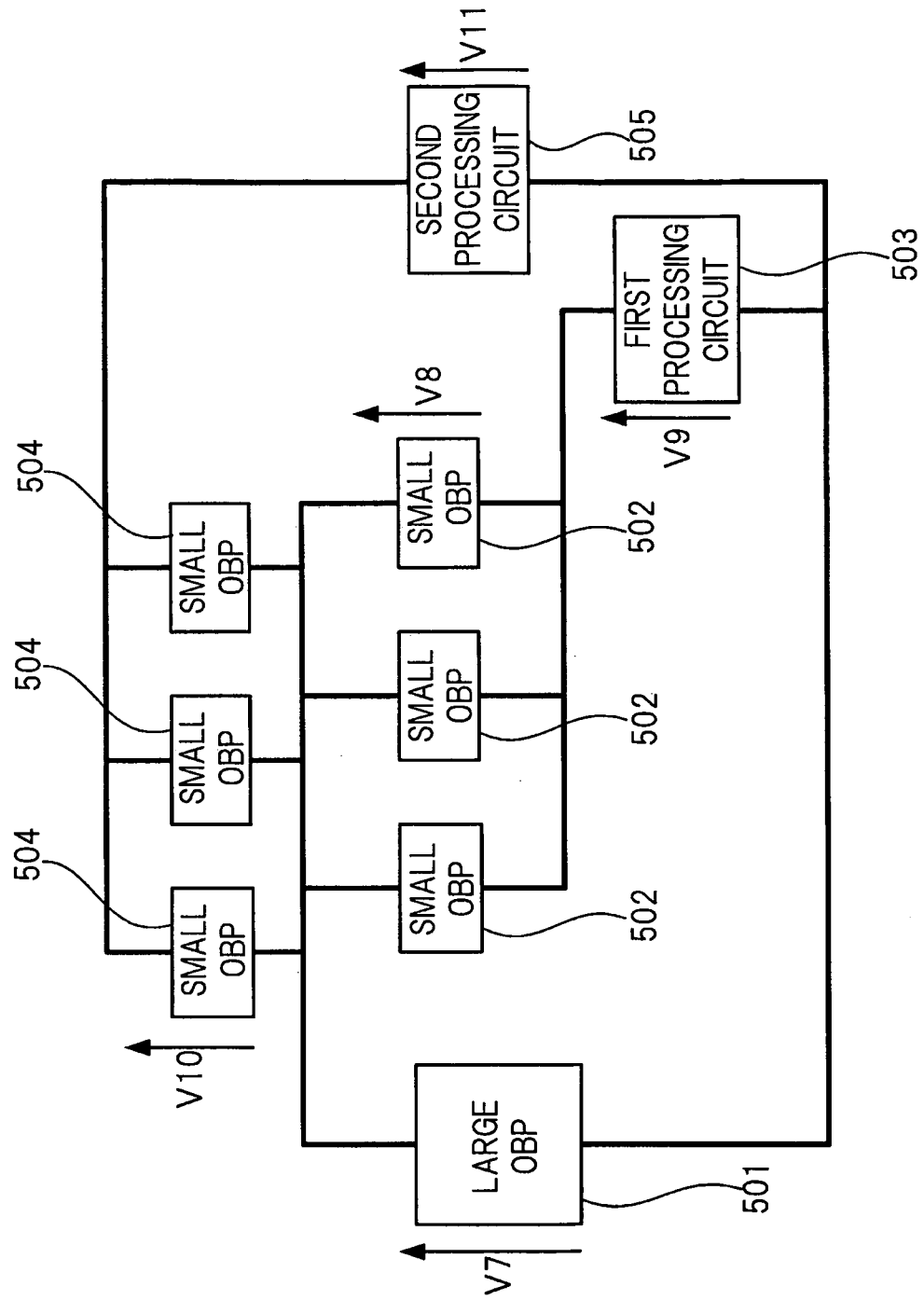
FIG. 9 illustrates one example of a circuit structure using addition and subtraction in combination as a method of increasing an application voltage from a large OBP by adding an application voltage from a small OBP as well as decreasing an application voltage from the large OBP by subtracting an application voltage from the small OBP.

FIG. 9 illustrates one example of a circuit structure using addition and subtraction in combination as a method of increasing an application voltage from a large OBP by adding an application voltage from a small OBP as well as decreasing an application voltage from the large OBP by subtracting an application voltage from the small OBP.

FIG. 9 illustrates a first processing circuit 503 to which an application voltage V9 generated by the subtraction for the application voltage V7 from one large OBP is applied, and a second processing circuit 505 to which an application voltage V11 generated by the addition is applied.

To the first processing circuit 503, a group composed of three first small OBP's 502 connected in parallel is connected. The application voltage V8 from the first small OBP's 502 is opposite in polarity to the application voltage V7 from the large OBP. Therefore, the application voltage V9 of the first processing circuit 503 is one that is calculated by subtracting the application voltage V8 by the first small OBP's 502 from the application voltage V7 by the large OBP.

On the other hand, an application voltage V10 from second small OBP's 504 connected to a second processing circuit 505 and forming a group by parallel connection of three OBP's 504, is homopolar to the application voltage V7 from one large OBP. Therefore, the application voltage V11 of the second processing circuit 505 is one that is calculated by adding the application voltage V10 from the second small OBP's 504 to the application voltage V7 from the large OBP.

It is without saying that power is adequately supplied to each processing circuit by using any of the above-explained circuit structure, since the large OBP having a relatively large capacity and the small OBP having a relatively small capacity compensate each other in a similar manner as in the above-described mode employing the circuit structure in FIG. 6.

Incidentally, in the above-description, explanation has been made about the example in which power to be supplied to a processing circuit is controlled by adjusting increase and decrease of a voltage to be applied to the processing circuit. However, the first supply section and the second supply section according to the present invention may be one that controls power to be supplied to the processing circuit by adjusting an amount of a current to be supplied to the processing circuit.

According to the aspect of the present invention, it is possible to obtain a power supply device capable of supplying power adequately to various kinds of components, an IC or the like included in an electronic apparatus, respectively and an electronic apparatus mounted with the power supply device.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A power supply device comprising:
   a detection section;
   a first supply section that supplies power in accordance with an extent of a load in processing in a processing device, which processes data, by applying a voltage to the processing device in accordance with an error between an average value of the voltage applied to the processing device and detected by the detection section and a predetermined reference value; and
   a second supply section that supplies, to the processing device, power smaller than the supplying power by the first supply section, in accordance with an extent of a load in processing in the processing device to increase and decrease a voltage with respect to the application voltage by the first supply section in accordance with an error between a voltage applied to the processing device and detected by the detection section and the predetermined reference value.

2. The power supply device according to claim 1, wherein a plurality of the second supply sections are provided.

3. The power supply device according to claim 1, wherein the processing device includes a plurality of processing sections each of which executes processing; and
   the second supply section forms a plurality of groups which correspond to the plurality of processing sections, respectively and which supply power to the plurality of processing sections, respectively.

4. The power supply device according to claim 1, wherein the second supply section supplies addition power to be added to the power supplied by the first supply section.

5. The power supply device according to claim 1, wherein the second supply section supplies subtraction power to be subtracted to the power supplied by the first supply section.

6. An electronic apparatus comprising:
   a processing device that processes data; and
   a power supply device that includes:
      a detection section;
      a first supply section that supplies power in accordance with an extent of a load in processing in a processing device, which processes data, by applying a voltage to the processing device in accordance with an error between an average value of the voltage applied to the processing device and detected by the detection section and a predetermined reference value; and
      a second supply section that supplies, to the processing device, power smaller than the supplying power by the first supply section, in accordance with an extent of a load in processing in the processing device to increase and decrease a voltage with respect to the application voltage by the first supply section in accordance with an error between a voltage applied to the processing device and detected by the detection section and the predetermined reference value.

* * * * *